United States Patent
Comer

(10) Patent No.: US 7,113,545 B2
(45) Date of Patent: Sep. 26, 2006

(54) METHOD AND APPARATUS FOR MOTION COMPENSATED TEMPORAL INTERPOLATION OF VIDEO SEQUENCES

(75) Inventor: Mary Lafuze Comer, Fairmount, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 650 days.

(21) Appl. No.: 10/363,380

(22) PCT Filed: Aug. 27, 2001

(86) PCT No.: PCT/US01/26514

§ 371 (c)(1),
(2), (4) Date: Feb. 27, 2003

(87) PCT Pub. No.: WO02/19721

PCT Pub. Date: Mar. 7, 2002

(65) Prior Publication Data

US 2004/0037358 A1 Feb. 26, 2004

Related U.S. Application Data

(60) Provisional application No. 60/228,362, filed on Aug. 28, 2000.

(51) Int. Cl.
H04N 7/12 (2006.01)
H04B 1/66 (2006.01)

(52) U.S. Cl. ............................................. 375/240.16

(58) Field of Classification Search ........... 375/240.12, 375/240.13, 240.15, 240.16, 240; 382/232; 348/699, 700; H04N 7/12; H04B 1/66
See application file for complete search history.

(56) References Cited

U.S. PATENT DOCUMENTS 5,596,369 A    1/1997  Chau ........................... 348/402

(Continued)

FOREIGN PATENT DOCUMENTS

WO          92/19068          10/1992

OTHER PUBLICATIONS

Russell C. Hardie et al., "Ranking in $R^P$ and its Use in Multivariate Image Estimation," IEEE Transactions on Circuits and Systems for Video Technology, vol. 1, No. 2, Jun. 1991, pp. 197-209.

(Continued)

Primary Examiner—Tung Vo
(74) Attorney, Agent, or Firm—Joseph J. Laks; Ronald H. Kurdyla; Guy H. Eriksen

(57) ABSTRACT

A method and device for processing video signals is provided, comprising the steps of: selecting a motion vector having the least mean square error from an M×N block, applying a vector filter to the motion vector, and if filter output MSE is below a present threshold select the filtered motion vector as output filter, and if above the threshold, select input vector as output filter. Perform a P×Q nearest neighbor motion vector substitution on the output motion vector field, where P is less than M and Q is less than N. Perform an S×T nearest neighbor substitution on the output motion vector field, where S is less than P and T is less than Q.

14 Claims, 3 Drawing Sheets

U.S. PATENT DOCUMENTS

| | | | |
|---|---|---|---|
| 5,745,182 A | 4/1998 | Yukitake et al. | 348/416 |
| 5,751,861 A | 5/1998 | Astle | 382/250 |
| 5,903,313 A | 5/1999 | Tucker et al. | 348/416 |
| 5,978,032 A | 11/1999 | Yukitake et al. | 348/416 |
| 5,991,865 A | 11/1999 | Longhenry et al. | 712/7 |
| 6,141,381 A | 10/2000 | Sugiyama | 375/240.16 |
| 6,148,034 A | 11/2000 | Lipovski | 375/240.16 |
| 6,178,205 B1 | 1/2001 | Cheung et al. | 375/240.29 |
| 6,185,340 B1 | 2/2001 | Comer | 382/236 |
| 6,192,080 B1 | 2/2001 | Sun et al. | 375/240.16 |
| 6,208,692 B1 | 3/2001 | Song et al. | 375/240.29 |
| 6,215,823 B1 | 4/2001 | Kim et al. | 375/240.16 |
| 6,219,103 B1 | 4/2001 | Sugiyama | 348/452 |
| 6,233,392 B1 | 5/2001 | Comer | 386/68 |
| 6,269,484 B1 | 7/2001 | Simsic et al. | 725/151 |
| 6,363,115 B1 * | 3/2002 | Doux | 375/240.16 |
| 6,748,113 B1 * | 6/2004 | Kondo et al. | 382/232 |

OTHER PUBLICATIONS

Kan Xie et al., "*Hierarchical Motion Estimation with Smoothness Constraints and Postprocessing,*" Optical Engineering, Soc. Of Photo-Optical Instrumentation Engineers, Bellingham, US, vol. 35, No. 1, 1996, pp. 145-154.

Ehud Weiner et al., "*Interpolation of Skipped Image Frames for Image Sequence Coding,*" Electrical and Electronics Engineers in Israel, New York, NY, USA, IEEE, US, Mar. 5, 1991, pp. 178-181.

Franco Bartolini et al., "*Median Based Relaxation of Smoothness Constraints in Optic Flow Computation,*" Pattern Recognition Letters, North-Holland Publ., Amsterdam, NL, vol. 18, No. 7, Jul. 1, 1997, pp. 649-655.

\* cited by examiner

METHOD AND APPARATUS FOR MOTION COMPENSATED TEMPORAL INTERPOLATION OF VIDEO SEQUENCES

This application claims the benefit under 35 U.S.C. § 365 of International Application PCT/US01/26514 filed Aug. 27, 2001, which claims the benefit of U.S. Provisional Application No. 60/228,362, filed Aug. 28, 2000.

BACKGROUND OF THE INVENTION

1. Technical Field

The invention relates generally to the processing of video signals; and more particularly to the interpolation of temporally consecutive video frames.

2. Description of the Prior Art

Block-based minimum mean-squared error (MSE) motion estimation techniques used to interpolate motion between two temporally-consecutive frames of a video sequence, provide the best match for each block, but do not necessarily provide motion vectors which represent true motion. Previously proposed motion compensated temporal interpolation (MCTI) algorithms have used modified motion estimation methods for estimating motion to ultimately display a reasonable reconstructed version of the image transmitted. When extraction of the motion is not precise, the image reconstructed will not be smooth and will include discontinuities. Therefore, there exists a need for an improved scheme for motion compensated interpolation of video sequences between temporally-related video frames.

SUMMARY OF THE INVENTION

The instant invention is a method for motion compensated temporal interpolation of video frames using filter motion-vector fields. The method encompasses fitering the motion-vector field produced by a standard block-based minimal mean-squared error (MSE) motion estimator. Upon filtering, MPEG-encoded motion vectors can be used for interpolation and use of a specialized motion compensated temporal interpolation (MCTI) estimator is not necessary.

In one exemplary embodiment of the invention, filtering of received motion vector fields is accomplished by first processing the motion vector field at block size 32×32. For each 32×32 block, compute the MSE for each of the received motion vectors on the block (or a subset thereof) and select a motion vector which minimizes the MSE for the 32×32 block. Second, process the motion vector field at block size 16×16, apply a nonlinear vector filter to the motion vector field, and then perform 16×16 nearest-neighbor motion vector substitution. Third, process the motion vector field at block size 8×8 and apply 8×8 nearest-neighbor motion vector substitution.

DETAILED DESCRIPTION

The invention is directed to a process for increasing the frame rate of a video sequence by interpolating new frames between temporally-consecutive frames of the original sequence. The temporal interpolation is performed along motion trajectories using motion vectors between each pair of temporally-consecutive original frames.

One exemplary embodiment of the process according to the principles of the present invention is implementable with a computer having a Pentium IV or equivalent class processor, RAM and ROM memory for storing codes executable by the processor to perform the process according to the invention.

Figure 1:
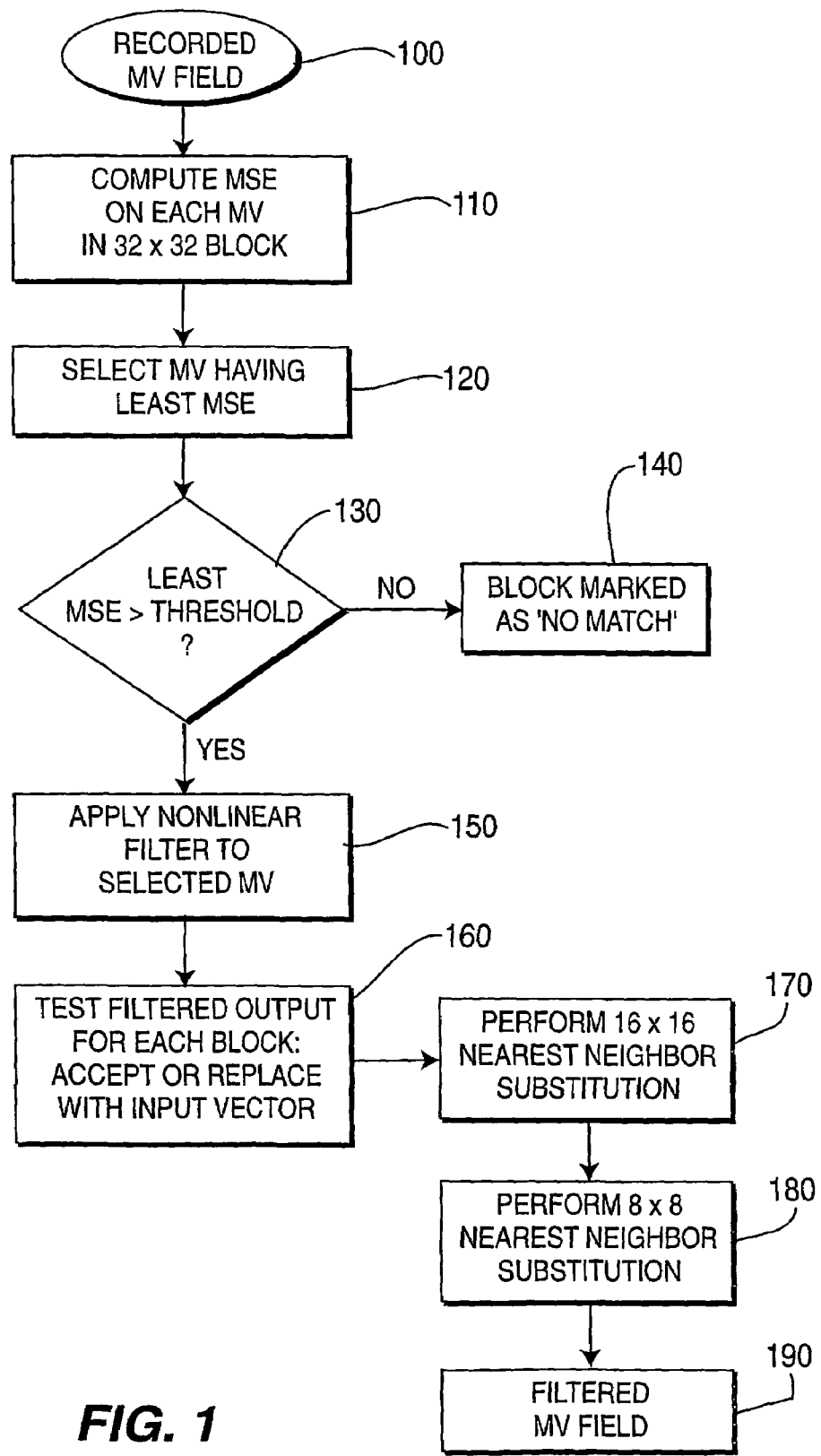
FIG. 1 shows a flow diagram of the filtering method according to a preferred embodiment of the present invention.

Referring to FIG. 1, image data coded into blocks is received, the blocks having motion vectors (step 100). The motion vector field at 32×32 pixel block size is processed. For each 32×32 block, compute the mean-squared error (MSE) using each of the received motion vectors within that 32×32 block (step 110). The motion vector having the least MSE is selected (step 120), and it is tested against a predetermined threshold (step 130). If the minimum MSE is greater than the present threshold value, there is no match and the block is marked as having no match (step 140). Otherwise, the motion vector minimizing the MSE is selected as the motion vector for the 32×32 block.

The chosen motion vector is then further localized in succeedingly smaller blocks. A vector filter is applied to the chosen motion vector. The filter is preferably nonlinear, such as the RE filter described in (step 150) "Ranking in $R^P$ and its use in multivariable image estimation", Hardie and Arce, IEEE Transaction on Circuits and Systems for Video Technology, Vol. 1, No. 2, pp. 197–209, June 1991. Application of the nonlinear filter removes the more noisy components of the motion vector data. After the filter has been applied, the filtered motion vector is tested against for each 16×16 block to determine whether the filtered output motion vector can be either accepted or replaced by the input motion vector to the filter for that block. This is because the filter is applied to the motion vector field without any consideration of the pixel data of the frames being interpolated. For a given 16×16 block let the MSE obtained using the input to the filter be $MSE_{in}$ and let the MSE obtained using the output of the filter be $MSE_{out}$. Then if $MSE_{out} < 16 \times MSE_{in}$ then the filtered output motion vector is selected for the block. Otherwise the input motion vector is retained for the block (step 160). Then, 16×16 nearest neighbor substitution is performed. For each 16×16 block, the current motion vector for that block is tested against the motion vectors of the four nearest neighboring 16×16 blocks. The motion vector which minimizes the MSE for the 16×16 block is selected as the output of the block group (step 170). As at the 32×32 level, if the minimum MSE is above a threshold value, the block is marked as having no match.

The nearest-neighbor substitution process is then applied to 8×8 blocks. For each 8×8 block the current motion vector for that block is tested against the motion vectors of the four nearest neighboring 8×8 blocks. The motion vector which minimizes the MSE for the 8×8 block is selected as the output for that block group (step 180). Again, the block is marked as having no match if the minimum MSE is above a threshold value.

According to this embodiment of the invention, the output of the 8×8 nearest neighbor substitution process is the motion vector field which is used to interpolate between the two input frames (step 190).

Generally, the method encompassed in the principles of the present invention may be summarized as comprising the following generalized steps: selecting a motion vector having the least mean square error from an M×N block, applying a vector filter to the motion vector, and if filter output MSE is below a preset threshold select the filtered motion vector as output filter, and if above the threshold, select input vector as output filter. Perform a P×Q nearest neighbor motion vector substitution on the output motion vector field, where P is less than M and Q is less than N. Perform an S×T nearest neighbor substitution on the output motion vector field, where S is less than P and T is less than Q.

Figure 2:
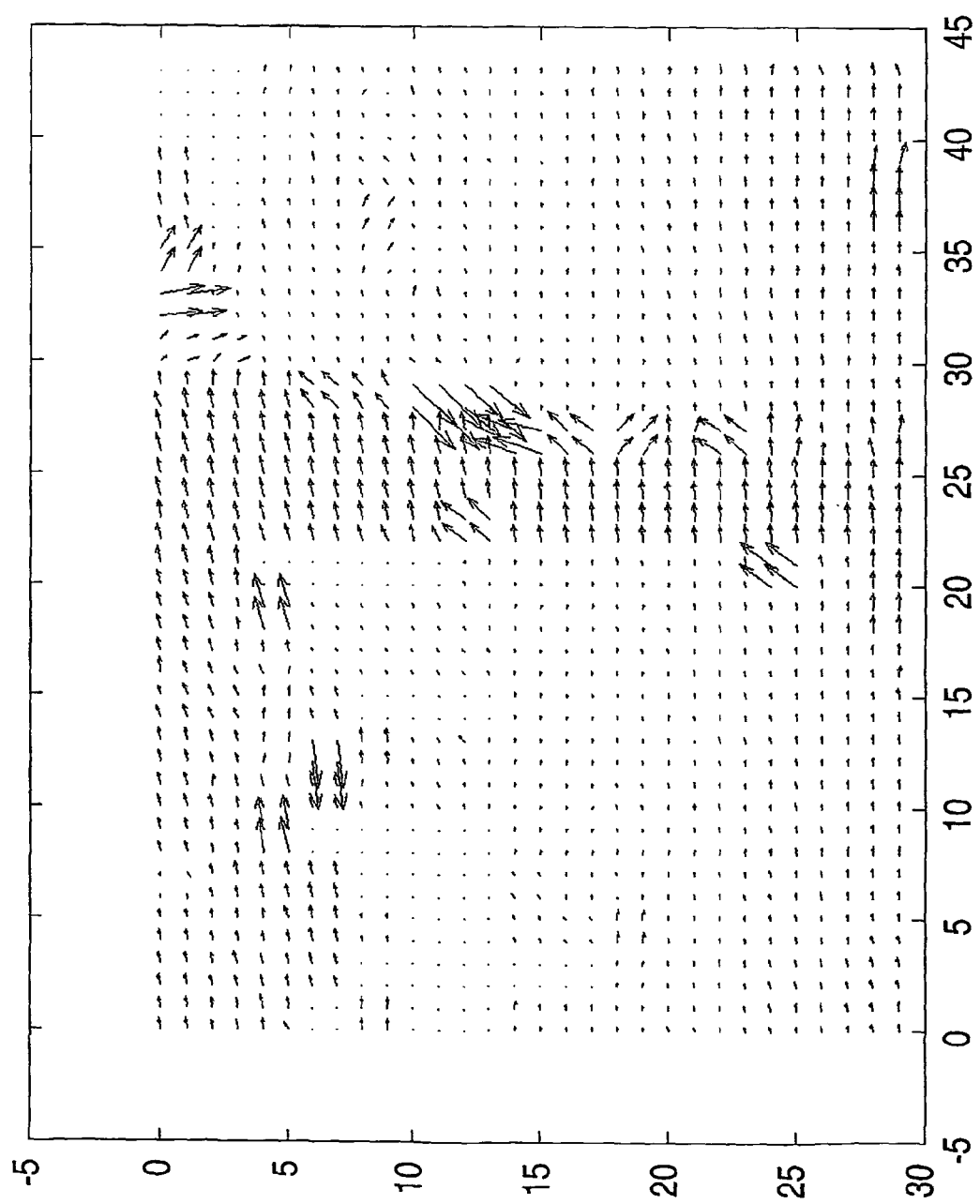
FIG. 2 shows a plot of the motion vector field of the video data as received prior to processing according to the present invention.

FIG. 2 shows the motion vector field prior to processing, in accordance with the principles of the present invention.

Figure 3:
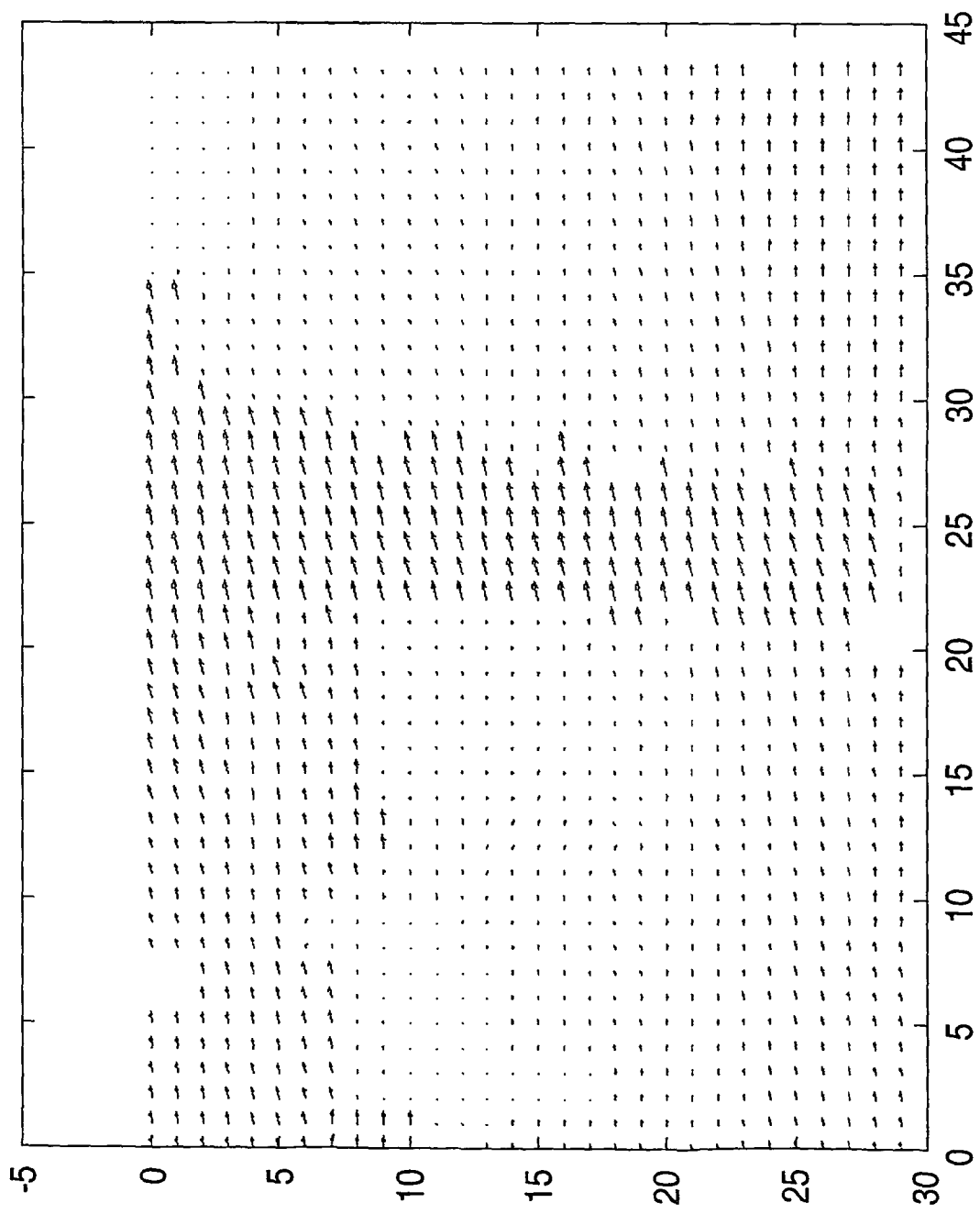
FIG. 3 shows a plot of the motion vector field after processing according to the present invention.

FIG. 3 shows the motion vector field after processing, in accordance with the principles of the present invention. It can be seen that the motion vectors appear in random directions prior to processing and are in a substantially common direction after the processing. Advantageously, the processing of the video data according to the present invention extracts the motion vectors having true motion. Interpolation of the true motion vectors results in a smooth reconstructed image.

A representative listing including coding instructions for an interpolation process is shown as follows:

For a received bit stream having progressive material, M=1, regular GOP structure, and spatial resolution J×K, the received bitstream having frame structure $P_1$, $P_3$, $P_5$, $P_7$, interpolation is performed half way between two frames to insert a frame between each frame pair. As an example, interpolation of the $P_3$ and $P_1$ frames to form interpolated frame $B_2$:

$P_3$ picture having J/16×K/16 field of motion vectors. $M_3$ (x,y)

Filter $M_3$ (x,y) using the process described above to obtain new motion vector field $m_3$ (x,y). Use $m_3$ (x,y) to compute frame $B_2$.

For $\chi=0, \ldots, J/16-1$; $y=0, \ldots K/16-1$
  $\chi'=16\chi+d\chi/4, y'=16y+dy/4$ where
  $(d\chi, dy)=m_3(x,y)$ For $i=0, \ldots 15$; $j=0, \ldots 15$
  Compute $B_2$ ($\chi'+i$, $y'+j$)

$$B_2(\chi+j, y'+j) = [a_1 P_1(\chi'+j+dx/4, y'+i+dy/4) +$$
$$b_1 P_1(\chi'+j+d\chi/4+1, y'+i+dy/4) +$$
$$c_1 P_1(\chi'+j+dx/4, y'+i+dy/4+1) +$$
$$d_1 P_1(\chi'+j+dx/4+1, y'+i+dy/4+1) +$$
$$a_3 P_3(\chi'+j-dx/4-1, y'+i-dy/4-1) +$$
$$b_3 P_3(\chi'+j-dx/4, y'+i-dy/4-1) +$$
$$c_3 P_3(\chi'+j-dx/4-1, y'+1-dy/4) +$$
$$a_3 P_3(\chi'+j-dx/4, y'+i, dy/4)]/16$$

$a_1 = (4-dx \% 4)*(4-dy \% 4)$
$b_1 = (dx \% 4)*(4-dy \% 4)$
$c_1 = (4-dx \% 4)*(dy \% 4)$
$d_1 = (dx \% 4)*(dy \% 4)$
$a_3 = (dx \% 4)*(dy \% 4) = d_1$
$b_3 = (4-dx \% 4)*(dy \% 4) = c_1$
$c_3 = (dx \% 4)*(4-dy \% 4) = b_1$
$d_3 = (4-dx \% 4)*(4-dy \% 4) = a_1$

If $B_2$ ($\chi'+i$, $y'+j$) has already been computed, keep a running average, or keep all values computed and average, or do not replace old value with new value, or scrap old and new values and use zero motion vector.

If pixel ($\chi_o y_o$) has not been visited:
  If ($\chi_o y_o$) was in an intro-coded macroblock in $P_3$ AND $P_1$ ($\chi_o y_o$) was used for prediction $B_2(\chi_o y_o) = P_3(\chi_o y_o)$ Else if ($\chi_o y_o$) was in an intra-coded MB in $P_3$ AND $P_1(\chi_o y_o)$ was not used for prediction $B_2(\chi_o y_o) = (P_1(\chi_o y_o) + P_3(\chi_o y_o))/2$ Else if ($\chi_o y_o$) was not in an intra-coded MB in $P_3$ and $P_1(\chi_o y_o)$ was used for prediction
  Use spatial interpolation for $B_2(\chi_o y_o)$ Else $B_2(\chi_o y_o) = P_1(\chi_o y_o)$ Nearest-neighbor MV Substitution:
  For each block:
  if not intra, compute MSE using current motion vector
  for each non-intra neighbor, use neighbor's motion vector
    to compute MSE
  Find minimum MSE
  if (minimum MSE<threshold)
    Select corresponding motion vector else
    block is intra Having described embodiments of the above invention, it is noted that modifications and variation can be made by persons skilled in the art in light of the above teachings. It is therefore to be understood that changes may be made in the particular embodiments of the invention disclosed which are within the scope and spirit of the invention as defined by the appended claims.

The invention claimed is:

1. A method of processing video signals in the form of motion vectors generated by motion estimation, the method characterized by the steps of:
  selecting a motion vector having the least mean square error from a block of size M×N;
  applying a vector filter to the motion vector, if filter output MSE is below a preset threshold select the filtered motion vector as output filter, and if above the threshold, select input vector as output filter;
  performing a P×Q nearest neighbor motion vector substitution on the output motion vector field, where P is less than M and Q is less than N; and
  performing an S×T nearest neighbor substitution on the output motion vector field, where S is less than P and T is less than Q.

2. The method according to claim 1, wherein the step of applying a vector filter is performed using a nonlinear filter.

3. The method according to claim 2, wherein the nonlinear filter is the $R_E$ filter.

4. The method according to claim 1, wherein the preset threshold is sixteen times MSE of the input vector.

5. The method according to claim 1, wherein the step of performing P×Q nearest neighbor substitution includes comparing the output motion vector against motion vectors of neighboring P×Q blocks and outputting the motion vector having the smallest MSE.

6. The method according to claim 1, wherein the step of performing S×T nearest neighbor substitution includes comparing the selected motion vector against motion vectors of neighboring S×T blocks and outputting the motion vector having the smallest MSE.

7. The method according to claim 1, wherein M×N is 32×32, P×Q is 16×16 and S×T is 8×8.

8. An apparatus for processing video signals in the form of motion vectors generated by motion estimation, the apparatus characterized by:
- means for selecting a motion vector having the least mean square error from a block of size M×N;
- means for applying a vector filter to the motion vector, if filter output MSE is below a preset threshold select the filtered motion vector as output filter, and if above the threshold, select input vector as output filter;
- means for performing a P×Q nearest neighbor motion vector substitution on the output motion vector field, where P is less than M and Q is less than N; and
- means for performing an S×T nearest neighbor substitution on the output motion vector field, where S is less than P and T is less than Q.

9. The apparatus according to claim 8, wherein the step of applying a vector filter is performed using a nonlinear filter.

10. The apparatus according to claim 9, wherein the nonlinear filter is the $R_E$ filter.

11. The apparatus according to claim 8, wherein the preset threshold is sixteen times MSE of the input vector.

12. The apparatus according to claim 8, wherein the step of performing P×Q nearest neighbor substitution includes comparing the output motion vector against motion vectors of neighboring P×Q blocks and outputting the motion vector having the smallest MSE.

13. The apparatus according to claim 8, wherein the step of performing S×T nearest neighbor substitution includes comparing the selected motion vector against motion vectors of neighboring S×T blocks and outputting the motion vector having the smallest MSE.

14. The apparatus according to claim 8, wherein M×N is 32×32, P×Q is 16×16 and S×T is 8×8.

* * * * *